Feb. 21, 1933.  R. S. SANFORD  1,898,315
BRAKE
Filed Dec. 27, 1926  2 Sheets-Sheet 1
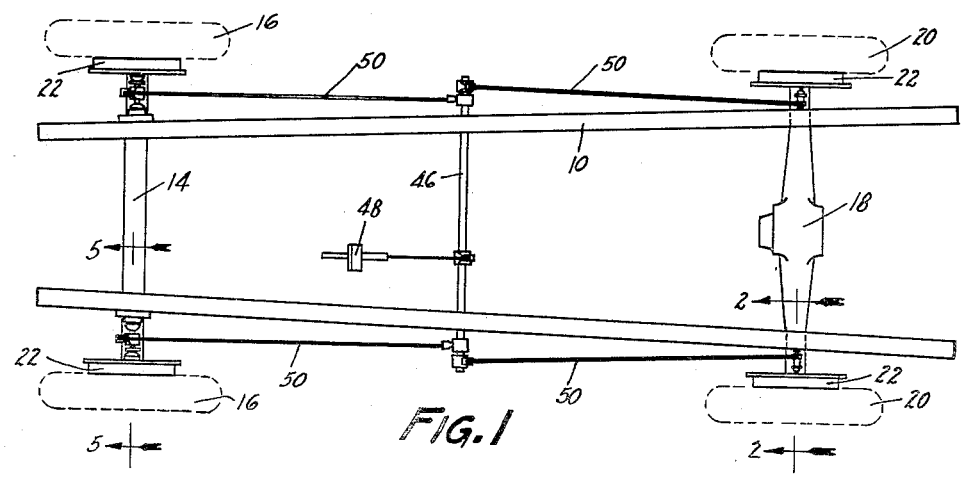
FIG.1
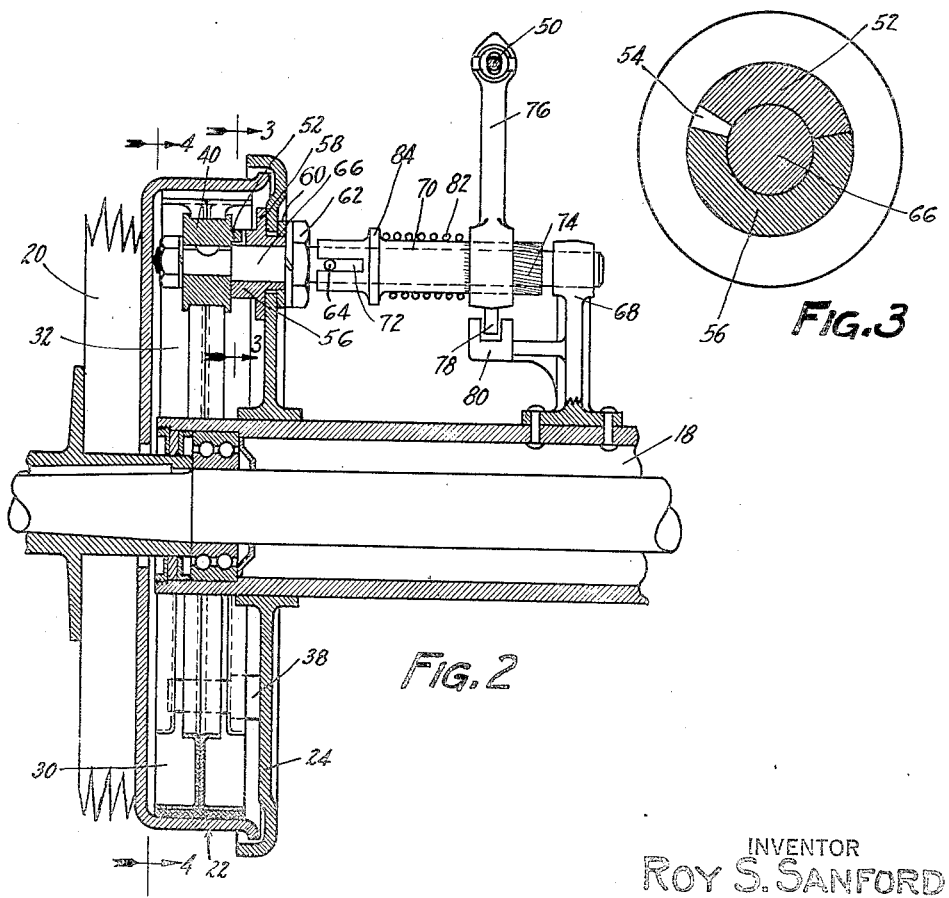
FIG.2
FIG.3
INVENTOR
ROY S. SANFORD
BY
ATTORNEY Feb. 21, 1933.   R. S. SANFORD   1,898,315
BRAKE
Filed Dec. 27, 1926   2 Sheets-Sheet 2

INVENTOR
Roy S. Sanford
BY
*M. W. McConkey*
ATTORNEY

Patented Feb. 21, 1933

1,898,315

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE

Application filed December 27, 1926. Serial No. 157,097.

This invention relates to brakes, and is illustrated as embodied in an automobile chassis having a brake on each of the four wheels. An object of the invention is to provide novel means for adjusting the brakes automatically.

One important feature of the invention relates to adjusting each of the four brakes independently of the other three by automatically operated means, so that the original relation of the brakes to each other will be maintained automatically in spite of different wear on the different brakes. Various features of novelty relate to the particular mechanisms for automatically adjusting the different brakes. I prefer to provide an arm operating the shaft or the like which applies the brake, and which is automatically set from time to time as the brake wears to compensate for such wear. In the embodiment illustrated in the drawings, this is accomplished by having the arm splined on inclined splines formed on or carried by the shaft, so that shifting the arm or shifting the splines will give the desired angular adjustment of the arm.

Another feature of the invention relates to predetermining the releasing movement of the brake shoes or their equivalents by a frictionally mounted bearing or bracket for the cam-shaft which is notched or otherwise formed for engagement with a part of the cam so that it is shifted and automatically reset by the cam whenever the cam travels more than a predetermined distance in applying the brake.

The above and other objects and features of the invention will be apparent from the following description of the illustrative embodiments shown in the accompanying drawings, in which:

Figure 1 is a diagrammatic top plan view of an automobile chassis having four individually and automatically adjusted brakes;

Figure 2 is a section through one of the rear brakes on the line 2—2 of Figure 1 and showing the automatic adjustment;

Figure 3 is a partial section on the line 3—3 of Figure 2, showing the means for adjusting the frictionally clamped bracket;

Figure 4:
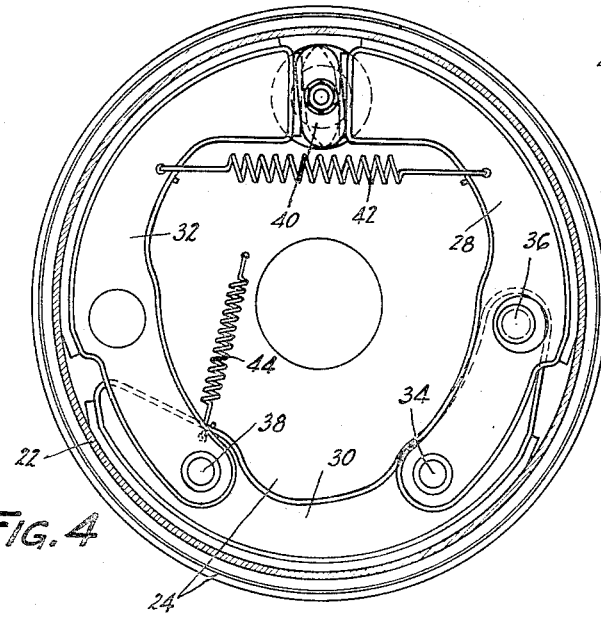
Figure 4 is a section on the line 4—4 of Figure 2 showing the shoes of the brake in side elevation.

The chassis illustrated in Figure 1 includes a frame 10 supported by the usual springs 12 (Figure 5) on a front axle 14 supported by the road wheels 16 and a rear axle 18 supported by the road wheels 20. Each wheel is provided with a brake which is illustrated as including a drum 22 rotating with the wheel, at the open side of which is a stationary support such as a backing plate 24 carried by the rear axle 18 or by the knuckle 26 of the front wheel.

The particular brake selected for illustration includes three shoes 28, 30, and 32, the shoe 28 being anchored on a pivot 34 carried by the backing plate 24, the shoe 30 being anchored on a pivot 36 carried by the backing plate 24, and the shoe 32 being connected to the shoe 30 by a floating pivot 38. The brake is applied by means such as a cam 40 against the resistance of a return spring 42, the shoe 30 being forced against the drum by shoe 32 against the resistance of an auxiliary return spring 44. Except as further described below, the brake may be substantially as fully described in Patent No. 1,567,716, granted Bendix Brake Company, on December 29, 1925, on an application of A. Y. Dodge.

The particular brake-operating hookup or set of connections illustrated in Figure 1 includes a single shaft 46 carried by the frame 10 and rocked to apply the brakes by the usual foot pedal 48 and which is provided at its ends with arms connected by pull rods or links 50 to the four brakes. It will be observed that the brakes are not equalized against each other so that if desirable one of them may be adjusted to receive a slightly greater brake-applying force than the others.

The cam 40 of each of the four brakes is illustrated as being provided with a projection 52 seated in a notch 54 formed in a bracket or support 56 (or 56′ in the modification of Figure 5) in which the cam-shaft is journalled. Each of the supports 56 is formed with a flange 58 engaging directly or through a friction washer 60 with the backing plate 24 and cooperating with a nut 62 frictionally to resist angular movement of the bracket 56. The projection 52 is somewhat smaller than the notch 54, so that the cam 40 has a predetermined angular movement without disturbing the bracket or support 56, whereas if the brake has worn the projection 52, after its predetermined angular movement, will engage the face of the notch 54 and shift the bracket 56 slightly about the axis of the cam-shaft when the brake is applied. When the brake is again released, the projection 52 will have a predetermined releasing movement, after which it will engage the end of the notch 54 and prevent further releasing movement of the cam 40. Thus the cam will hold the brake shoes in such position as to give them predetermined clearance with respect to the drum 22.

As shown in Figure 2, the cam-shaft 66 of each of the rear brakes, which is journalled at one end in the adjustable support or bearing 56, is journalled at its opposite end in a bracket 68 mounted on the axle 18. A sleeve 70 mounted on the shaft 66 is slotted at one end at 72 to embrace pins 64 on opposite sides of the shaft 66, thus keying the sleeve 70 to the cam-shaft in a manner which permits the sleeve to move axially of the shaft while at the same time angular movement of the sleeve will cause angular movement of the shaft. At its inner end the sleeve 70 is formed with inclined splines 74 slidably received in the splined hub of an operating arm or lever 76 connected to the corresponding link 50. Movement of the arm 76 axially of the shaft 66 may be prevented by a projection 78 received in a fork 80 formed on or carried by the bracket 68. A coil spring 82 is confined between the arm 76 and a flange 84 on the sleeve 70, and since the arm 76 is held by the fork 80 the spring 82 constantly urges the sleeve 70 toward the left in Figure 2.

When the brake is released, if it has worn sufficiently to cause an adjustment of the support 56, the shaft 66 will be stopped by the projection 52 before the link 50 has reached the end of its releasing movement. Thereupon the spring 82 will be free to shift the sleeve 70 to the left so that the inclined splines 74 will turn the arm 76 with respect to the axis of shaft 66 to bring it back once more to its original released position, thus compensating for the automatic adjustment of the cam 40.

Figure 6:
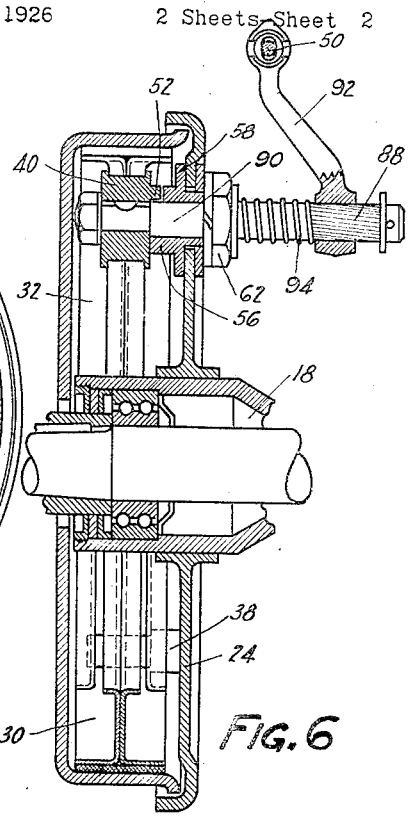
Figure 6 is a section corresponding to Figure 2 but showing a modified means for adjusting one of the rear brakes.

In Figure 6 is shown a modification of the mechanism of Figure 2, in which the inclined splines 88 are formed directly on cam-shaft 90, and the operating arm 92 is splined directly on the inclined splines 88. A spring 94 confined between the nut 62 and the arm 92 serves as before to shift the arm with respect to the splines to compensate for adjusted released positions of the cam 40 to provide predetermined clearance of the brake shoes with respect to the drum as they become worn.

Figure 5:
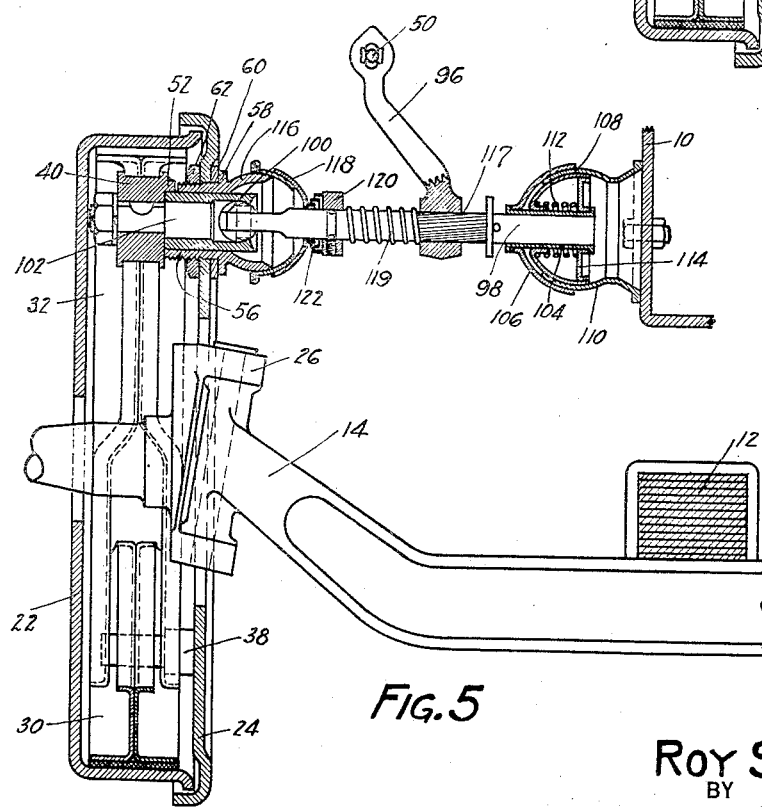
Figure 5 is a section through one of the front brakes on the line 5—5 of Figure 1 and showing the automatic adjustment as applied to a Perrot control.

The mechanism for operating one of the front wheel brakes is shown in Figure 5, the control through which the brake is operated in a manner permitting the wheel to be swivelled in steering being generally of the Perrot type described in Patent No. 1,604,394, granted Bendix Brake Company, on October 26, 1926, on an application of A. Y. Dodge.

In this illustrated type of control the brake is operated by an arm 96 on a control shaft 98 connected by a universal joint 100 to a relatively short cam shaft 102 journalled in the bearing 56 and on which the cam 40 is keyed or otherwise secured. The chassis end of the shaft 98 is slidably supported by a sleeve 104 carried by inner and outer hemi-spherical stampings 106 and 108 embracing a stationary spherical support 110 bolted or otherwise secured to the chassis frame 10. The stampings 106 and 108 are held yieldingly against the outside and inside of the support 110 by a spring 112 confined between the inner stamping 108 and diaphragm or stop 114 secured to the end of the sleeve 104. The support 56 is extended to form a partial enclosure 116 cooperating with stampings 118 mounted on the control shaft 98 to inclose the universal joint 100. The universal joint 100 is above and substantially in line with the pivot connecting the knuckle 26 to the axle 14.

According to the present invention the arm 96 is mounted on inclined splines 117 formed on or carried by the control shaft 98 and is urged along those splines by the spring 119 to compensate for the automatic adjustment of cam 40 in its released position as the brake wears. Spring 119 is confined between the arm 96 and a stop 120 secured to the control shaft 98. Stop 120 is illustrated as also serving as an abutment for a spring 122 holding the stampings 118 yieldingly in engagement with the part 116 of the cam-shaft bearing.

It will be seen that with the above-described arrangement each of the four brakes is automatically adjusted independently of the other three brakes so that there is always a predetermined applying and releasing movement of the brake for any given movement of the operating connections from the pedal 48. It will also be noted that connections to the four brakes are not equalized, so that if it should be desirable at any time to provide an initial adjustment of any one of the brakes slightly different from the others, that adjustment will automatically be preserved as the respective brakes wear. It will also be noted that if one brake should wear faster than the others the adjustment will compensate for the increased wear so that there will be no effect on the operating connections.

While certain illustrative embodiments have been described in detail, it is not my intention to limit the scope of this invention to those particular embodiments, or otherwise than by the terms of the appended claims.

I claim:

1. A brake-applying device including a cam and shaft, and a yieldingly-held bearing for the shaft, the bearing and cam having an interfitting notch and projection allowing a predetermined free movement of the shaft and then shifting the bearing.

2. A brake-applying device including a cam and shaft, and a yieldingly-held bearing for the shaft, the bearing having a notch and the cam having a projection in the notch arranged to allow a predetermined free movement of the shaft and then to shift the bearing.

3. A brake-applying device comprising, in combination, a brake-operating shaft, means for predetermining the angular position of the shaft to give substantially constant brake-releasing movement, an arm on the shaft for operating it, and means for shifting the arm axially and angularly of the shaft to preserve its angular position as the brake-released position of the shaft is varied.

4. A brake-applying device comprising, in combination, a brake-operating shaft having inclined splines, means for predetermining the angular position of the shaft to give substantially constant brake-releasing movement, an arm splined on the shaft for operating it, and means for shifting the arm along said splines to shift it angularly to preserve its angular position as the brake-released position of the shaft is varied.

5. A brake-applying device comprising, in combination, a brake-operating shaft, means for predetermining the angular position of the shaft to give substantially constant brake-releasing movement, an arm on the shaft for operating it, and a spring for shifting the arm axially and angularly of the shaft to preserve its angular position as the brake-released position of the shaft is varied.

6. A brake-applying device comprising, in combination, a brake-operating shaft having inclined splines, means for predetermining the angular position of the shaft to give substantially constant brake-releasing movement, an arm splined on the shaft for operating it, and a spring for shifting the arm along said splines to shift it angularly to preserve its angular position as the brake-released position of the shaft is varied.

7. A vehicle having a swivelled wheel with a brake, and a yieldingly-supported chassis part opposite the wheel, and comprising, in combination therewith, a brake-applying device swivelling with the wheel, wear-measuring means also swiveling with the wheel, a shaft movably supported at its inner end on said chassis frame and universally connected to said device at its outer end approximately at the swivelling axis of the wheel, an arm on said shaft arranged to rock the shaft to apply the brake, and means controlled by the wear-measuring means for automatically adjusting the arm angularly on the shaft as the brake wears, to preserve a constant released position of said arm and to predetermine the releasing movement of said brake-applying device.

8. A vehicle having a swivelled wheel with a brake, and a yieldingly-supported chassis part opposite the wheel, and comprising, in combination therewith, a brake-applying device swivelling with the wheel, means also swiveling with the wheel for adjustably predetermining the released position of said device as the brake wears, a shaft movably supported at its inner end on said chassis frame and universally connected to said device at its outer end approximately at the swivelling axis of the wheel, an arm on said shaft arranged to rock the shaft to apply the brake, and means for automatically adjusting the arm angularly on the shaft as said device is adjusted to compensate for wear of the brake, to preserve a constant released position of said arm in all adjusted positions of said brake-applying device.

9. A vehicle having a swivelled wheel with a brake, and a yieldingly-supported chassis part opposite the wheel, and comprising, in combination therewith, a brake-applying device swivelling with the wheel, a shaft movably supported at its inner end on said chassis frame and universally connected to said device at its outer end approximately at the swivelling axis of the wheel, an arm on said shaft arranged to rock the shaft to apply the brake, and means for automatically adjusting the arm angularly on the shaft as the brake wears, to preserve a constant released position of said arm and to predetermine the releasing movement of said brake-applying device, the shaft having inclined splines and the arm being shifted along said splines to accomplish its angular adjustment.

10. A brake-applying device comprising, in combination, a brake-applying shaft, a sleeve on the shaft arranged to cause angular movement of the shaft and sleeve together, an arm arranged to rock the sleeve, a device holding the arm against movement axially of the shaft, and means for shifting the sleeve axially with respect to the shaft and arm and causing angular adjustment of the arm with respect to the sleeve.

11. A brake-applying device comprising, in combination, a brake-applying shaft, a sleeve axially movable on the shaft and arranged to cause angular movement of the shaft and sleeve together and formed with inclined splines, an arm on said splines arranged to rock the sleeve, a device holding the arm against movement axially of the shaft, and means for shifting the sleeve axially with respect to the shaft to move said splines with respect to the arm and cause angular adjustment of the arm on the sleeve.

12. A brake-applying device comprising, in combination, a brake-applying shaft, a sleeve axially movable on the shaft and arranged to cause angular movement of the shaft and sleeve together and formed with inclined splines, an arm on said splines arranged to rock the sleeve, a device holding the arm against movement axially of the shaft, and a spring compressed and confined between said arm and a part of the sleeve and urging the splines axially with respect to the arm.

13. A brake comprising, in combination, a drum, friction means within and expansible against the drum, a device extending into the drum and arranged to apply the friction means, means within the drum to predetermine the brake-releasing movement of the friction means and the applying device, a part outside the drum for operating the applying device, and means for automatically adjusting said part with respect to the applying device to preserve a constant released position of said part in any released position of said device.

14. A brake comprising, in combination, a drum, friction means within and expansible against the drum, a cam within the drum and arranged to apply the friction means, means within the drum to predetermine the brake-releasing movement of the friction means and the cam, a part outside the drum for operating the cam, and means for automatically adjusting said part with respect to the cam to preserve a constant released position of said part in any released position of said cam.

15. A brake-applying device comprising, in combination, a brake-operating shaft in two sections connected by a universal joint, means acting on one of said sections for predetermining the angular position of the shaft to give substantially constant brake-releasing movement, an arm on the other section of the shaft for operating it, and means for shifting the arm angularly of the shaft to preserve its angular position as the brake-released position of the shaft is varied.

16. Brake applying mechanism comprising, in combination, a stationary support, a brake shaft extending through the support, a bearing for the shaft carried by the support and resistingly adjustable thereover, said shaft and bearing provided with co-operating parts adapted to limit the rotatable applying movement of the shaft and to transmit the torque thereof into thrust to adjustably position the bearing with respect to the support.

17. Brake applying mechanism comprising, in combination, a stationary support, a brake shaft bearing carried by the support and resistingly adjustable thereover, a brake shaft journaled in said bearing, an applying cam on the shaft, an operating arm on the shaft, means coupling said shaft with the bearing and means coupling said arm with the shaft whereby the permitted rotatable applying movement of the cam is predetermined, the bearing is automatically adjusted with respect to the support compensating for wear, and the arm is automatically angularly adjusted with respect to the cam to maintain a constant released position irrespective of the adjusting of the cam for wear.

18. Brake applying mechanism comprising, in combination, brake friction means, a rotatable brake shaft provided with a cam to apply the friction means and an operating arm to actuate the shaft, said arm and cam being relatively automatically angularly adjustable about the axis of the shaft to compensate for wear of the friction means and to maintain during said compensation a constant released position of the arm, there being a sleeve keyed to the shaft and spirally splined to the arm for effecting the described adjustment.

19. Brake applying mechanism comprising, in combination, a rotatable shaft provided with a cam, means predetermining the rotatable movement of the cam and automatically adjustable to vary the same, and an arm upon the shaft automatically adjustable thereon to maintain a constant released position irrespective of variation in the permitted rotatable movement of the cam, there being a sleeve keyed to the shaft and spirally splined to the arm for effecting the described adjustment.

In testimony whereof, I have hereunto signed my name.

ROY S. SANFORD.